US008484376B2

(12) United States Patent
Little

(10) Patent No.: US 8,484,376 B2
(45) Date of Patent: Jul. 9, 2013

(54) HOT-SWAPPABLE SERVICES IN DISTRIBUTED COMPUTING

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 773 days.

(21) Appl. No.: 11/982,068

(22) Filed: Oct. 31, 2007

(65) Prior Publication Data

US 2009/0113072 A1 Apr. 30, 2009

(51) Int. Cl.
*H06F 15/16* (2006.01)

(52) U.S. Cl.
USPC ........... 709/244; 709/245; 709/246; 709/248; 717/153; 717/167; 717/168

(58) Field of Classification Search
USPC .................. 709/244, 230, 242; 717/131, 122, 717/168; 707/10
See application file for complete search history.

(56) References Cited

U.S. PATENT DOCUMENTS

| | | | |
|---|---|---|---|
| 5,410,703 A * | 4/1995 | Nilsson et al. ................ | 717/168 |
| 6,427,164 B1 | 7/2002 | Reilly | |
| 7,080,078 B1 | 7/2006 | Slaughter et al. | |
| 7,159,224 B2 | 1/2007 | Sharma et al. | |
| 7,185,342 B1 | 2/2007 | Carrer et al. | |
| 7,245,712 B2 | 7/2007 | Hines | |
| 7,289,994 B2 * | 10/2007 | Nixon et al. ........................... | 1/1 |
| 7,383,541 B1 * | 6/2008 | Banks et al. .................. | 717/131 |
| 7,549,153 B2 | 6/2009 | Butterworth et al. | |
| 2001/0049745 A1 | 12/2001 | Schoeffler | |
| 2003/0005064 A1 | 1/2003 | McDowell et al. | |
| 2003/0224758 A1 * | 12/2003 | O'Neill et al. ................. | 455/411 |
| 2004/0044998 A1 * | 3/2004 | Wildhagen et al. ........... | 717/170 |
| 2004/0117199 A1 | 6/2004 | Fremantle et al. | |
| 2004/0168153 A1 * | 8/2004 | Marvin ......................... | 717/120 |
| 2004/0187095 A1 * | 9/2004 | Gilfix et al. ................... | 717/120 |
| 2006/0020922 A1 * | 1/2006 | Takizawa ....................... | 717/124 |
| 2006/0028994 A1 * | 2/2006 | Hofmann et al. .............. | 370/252 |
| 2006/0031414 A1 | 2/2006 | Betts et al. | |
| 2007/0011126 A1 | 1/2007 | Conner et al. | |
| 2007/0074204 A1 * | 3/2007 | Curtis et al. ................... | 717/174 |
| 2007/0078860 A1 | 4/2007 | Enenkiel | |
| 2008/0091774 A1 * | 4/2008 | Taylor et al. .................. | 709/203 |
| 2008/0126356 A1 | 5/2008 | Guo et al. | |
| 2008/0168458 A1 * | 7/2008 | Fachan et al. ................. | 718/104 |
| 2008/0291908 A1 | 11/2008 | Bachmann | |
| 2009/0019106 A1 | 1/2009 | Loupia | |

OTHER PUBLICATIONS

"Web Methods Integration Server JMS Client Developer's Guide"—webMethods, Dec. 2006 http://documentation.softwareag.com/webmethods/wmsuites/wMdoc/_webM_suite_71/Developer/Developer%207.1/webMethods%20Integration%20Server%20JMS%20Client%20Developer's%20Guide%207.1

(Continued)

*Primary Examiner* — Krista Zele
*Assistant Examiner* — Randy Scott
(74) *Attorney, Agent, or Firm* — Lowenstein Sandler LLP

(57) ABSTRACT

A message directed to a first version of a service is received at a content based router in a distributed computing system. The message is transmitted to a second version of the service instead of the first version of the service if the message is compatible with the second version of the service. The message is transmitted to the first version of the service if the message is not compatible with the second version of the service.

21 Claims, 5 Drawing Sheets

OTHER PUBLICATIONS

"Service Component Architecture JMS Binding Specification Version 1.1"—Oasis, Oct. 2005 https://www.oasis-open.org/committees/download.php/40046/sca-jmsbinding-1.1-spec-cd04-rev3.pdf.*

"JBossESB Requirements and Architecture, Version: 0.3," May 2, 2006, pp. 1-12.

OASIS, "Web Services Context Specification (WS-Context)," OASIS Committee draft version 0.8, Version created Nov. 3, 2004, Editors, Mark Little, et al., Copyright © 2004 The Organization for the Advancement of Structured Information Standards [Appendix A], pp. 1-23.

Van Huizen, Gordon, "JMS: An Infrastructure for XML-based Business-to-Business Communication, Learn how the Java Messaging Service can provide a flexible, reliable, and secure means of exchanging XML-based transactions," JavaWorld.com, Feb. 1, 2000, This story appeared on JavaWorld at http://www.javaworld.com/javaworld/jw-02-2000/jw-02-jmsxml.html, Mar. 14, 2007, pp. 1-13.

"Why ESB and SOA?" Version 0.3, Date: Jan. 27, 2006, pp. 1-7.

"Web Service Endpoint Identification and Resolution: Use Cases and Requirements", Version 1.0, GWD-I (draft-ggf-wse-id-usecases-1.0-3), *Open Grid Services Architecture Working Group*, Editors: F. Siebenlist, ANL ,et al. Apr. 21, 2006, ogsa-wg@ggf.org, pp. 1-16.

Hunt, John , "The Holy Grail of Sercies: SCA", *Reg Developer>>Code>>Java/J2EE*, Original URL: http://www.regdeveloper.co.uk/2007/03/13/sca_for_soa/print.html, Mar. 14, 2007, pp. 1-6.

Vasudevan, Venu , "A Web Services Primer", XML.com, Published on XML.com http://www.xml.com/pub/a/ws/2001/04/04/webservices/index.html, May 30, 2007, http://webservices.sml.com/lpt/a/760, pp. 1-10.

Red Hat Office Action for U.S. Appl. No. 11/897,096 mailed Jul. 30, 2010.

King, Erik, "Perpetual Enterprise Management Service (PEMS) for Next Generation SOA-based Command & Control Systems", Jun. 2005, 26 pages.

King, Erik, "Perpetual Enterprise Management Service (PEMS) for C2 SOA Deployments", Jun. 14, 2005, 23 pages.

Advisory Action mailed Sep. 30, 2010 for U.S. Appl. No. 11/897,096.

Office Action mailed Feb. 31, 2012 for U.S. Appl. No. 11/897,096.

Office Action mailed Jul. 9, 2012 for U.S. Appl. No. 11/897,097.

* cited by examiner

HOT-SWAPPABLE SERVICES IN DISTRIBUTED COMPUTING

TECHNICAL FIELD

Embodiments of the present invention relate to updating services in distributed systems, and more specifically to providing hot-swappable service updates for services.

BACKGROUND

There are many reasons to upgrade services in a distributed computing system. For example, a service may have bugs that are fixed in an update, security holes that are patched, new databases that are added, and so on. In conventional distributed computing systems, updating a service requires taking the service off line, updating it, and then bringing the updated service on line. This can pose a problem where a service is used frequently or is a critical service in a distributed computing system. In such an instance, it may be costly to take the service offline. Moreover, when a service is updated, the updated service is not always 100% backwards compatible with the original service that was updated. Therefore, clients of the service may no longer be able to use the service once it has become updated.

In some conventional distributed computing systems, an updated service is brought online in parallel to the original service. Clients of the original service are notified of the updated service when they attempt to use the original service. The original service is then removed from the distributed computing system after a specified period of time (generally one to two weeks), in the assumption that all clients will have been notified of the updated service. This method of updating a service requires that the original service be modified to provide the notification to the clients of the new service. Moreover, the original service is removed from operation based on an estimate that all users have begun using the updated service, rather than based on any empirical data.

BRIEF DESCRIPTION OF THE DRAWINGS

The present invention is illustrated by way of example, and not by way of limitation, in the figures of the accompanying drawings and in which.

DETAILED DESCRIPTION

Figure 1:
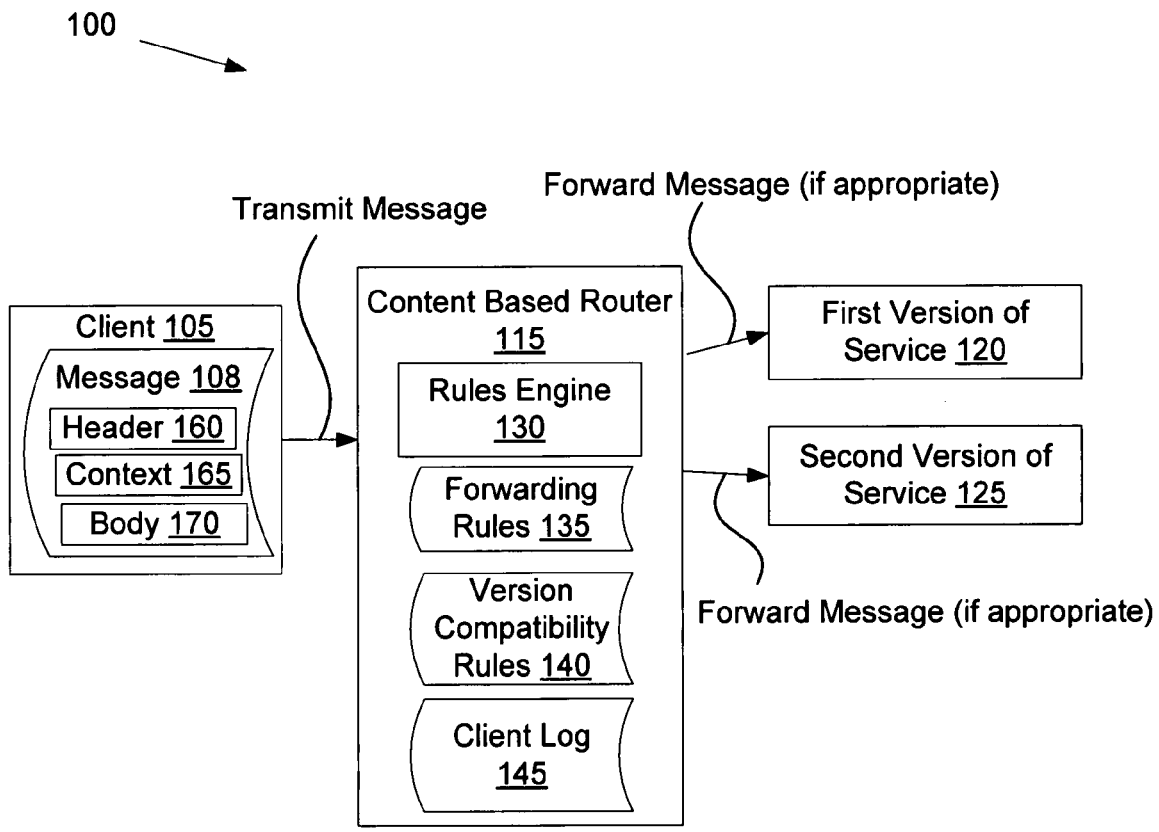
FIG. 1 illustrates a data flow diagram showing a message flowing through a distributed computing system, in accordance with one embodiment of the present invention.

Described herein is a method and apparatus for providing hot-swappable services, such as different hot-swappable versions of a service, in a distributed computing system. In one embodiment, a message directed to a first version of a service is received at a content based router in a distributed computing system. The message is transmitted to a second version of the service instead of the first version of the service if the message is compatible with the second version of the service. The message is transmitted to the first version of the service if the message is not compatible with the second version of the service. If the content based router detects that all clients are configured to send messages that are compatible with the second version of the service, the first version of the service may be removed from the distributed computing system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "sending", "forwarding", "determining", "notifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

Figure 2:
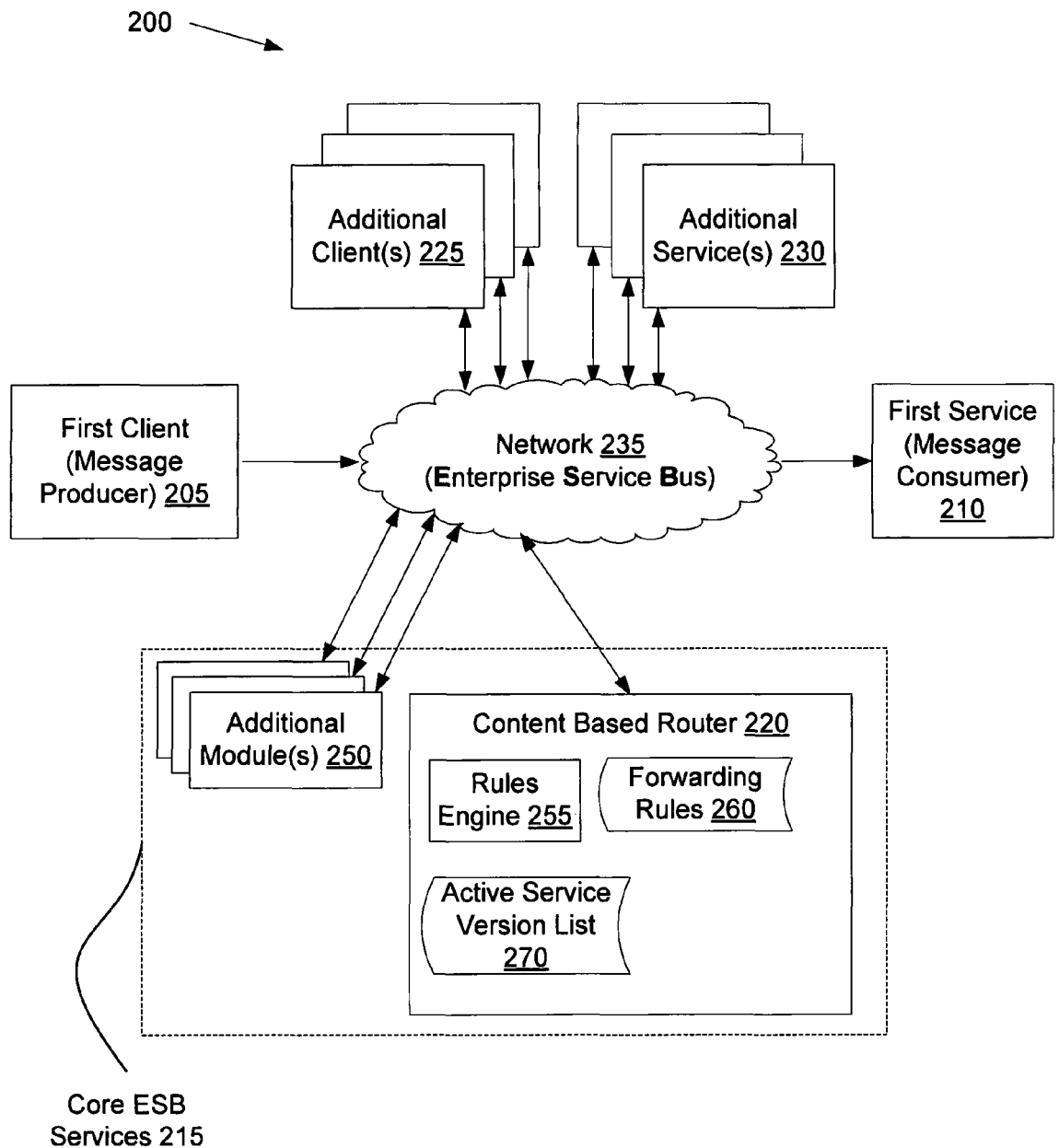
FIG. 2 illustrates an exemplary distributed computing system, in which embodiments of the present invention may operate.

FIG. 1 illustrates a data flow diagram 100 showing a message flowing through a distributed computing system, in accordance with one embodiment of the present invention. In one embodiment, the distributed computing system is implemented as a database. In other embodiments, the distributed computing system is implemented as a service oriented architecture (SOA) and/or as an enterprise service bus (ESB). An exemplary distributed computing system is illustrated in FIG. 2 below.

Returning to FIG. 1, a client 105 generates a message 108 and transmits it to a first version of a service 120 through the distributed computing system. Client 105 may be, for example, a personal computer (PC), palm-sized computing devices, personal digital assistants (PDA), etc. Client 105 may also be an application run on a PC, server, database, etc. In an SOA, client 105 includes an application that accesses services. Client 105 may be a fat client (client that performs local processing and data storage), a thin client (client that performs minimal or no local processing and minimal to no data storage), or a hybrid client (client that performs local processing but little to no data storage).

The message 108 may include data that may convey information to, or initiate an event on, a service 120, 125. The message 108 may be generated for any of a myriad of purposes. For example, the message 108 may be generated to report a purchase of a good, to request contact information, to begin a remote process (e.g., initiate a service), etc.

In one embodiment, message 108 includes a message header 160, a message context 165 and a message body 170. The message header 160 may include a unique message identifier and routing information (e.g., recipient, sender, message priority, etc.). The message header 160 may be used to identify the message 108, and to route the message 108 to end points (recipients) intended by client 105, or to other end points determined by the distributed computing system. The message 108 may be directed to a specific endpoint (e.g., a first version of service 120 or second version of service 125). Alternatively, the message 108 may be posted to an intermediate location, which one or more endpoints may communicate with to receive the message 108.

The message context 165 may include properties that support compatibility between services and clients. The message context 165 may provide, for example, custom fields or filters, transactional information (e.g., to identify a distributed transaction or session associated with the message), security information (e.g., authorization information, authentication information, etc.), and so on.

The message body 170 may include data to which a client or service may respond (e.g., by initiating an event). The content and configuration (layout) of the message body 170 may determine a message type. Examples of message types include text messages, map messages, bytes messages, stream messages and object messages. Other message types are also possible. In one embodiment, the message body is formatted using an extensible markup language (XML). Use of XML allows flexible information formats to be implemented. Other flexible information formats, such as standard generalized markup language (SGML) may also be used for the message body.

A content based router 115 intercepts the message 108, and forwards it to an appropriate service (e.g., first version of service 120 or second version of service 125). The service 120, 125 to which the message 108 is forwarded may be a service to which the message 108 is addressed, or a different service that is not addressed by the message 108.

The content based router 115 is a service of the distributed system that monitors the distributed computing system for messages, and transparently or opaquely routes the messages between clients and services. In one embodiment, the content based router 115 is a core service of an ESB, as shown in FIG. 2.

Returning to FIG. 1, in one embodiment the content based router 115 includes a rules engine 130, one or more forwarding rules 135, one or more version compatibility rules 140, and a client log 145. The rules engine 130 is a logic component that processes rules (e.g., forwarding rules 135 and version compatibility rules 140) to produce outcomes. The rules engine 130 may match facts, data and rules, and infer conclusions which may result in actions or events of, for example, the content based router 115. In one embodiment, the rules engine 130 matches the facts, data and rules using a Rete Algorithm. Alternatively, the rules engine 130 may use a Linear Algorithm, Treat Algorithm, Leaps Algorithm, etc. Hybrid algorithms that use combinations of, for example, the Leaps Algorithm and the Rete Algorithm, may also be used.

Forwarding rules 135 and version compatibility rules 140 are rules that are processed by rules engine 130. Each of the forwarding rules 135 may identify one or more versions of a service to forward a message to. For example, a forwarding rule may cause a message (e.g., message 108) directed to a first version of a service 120 to instead be sent to a second version of the service 125. Version compatibility rules 140 may indicate incompatibilities between versions of services. For example, a version compatibility rule 140 may indicate that the second version of the service 125 is compatible with the first version of the service 120, except for a version of a java virtual machine used, a version of a security protocol used, and so on. In one embodiment, the version compatibility rules 140 are incorporated into the forwarding rules 135. This may reduce a number of rules that are maintained on the content based router 115 at a possible expense of increasing complexity of those rules.

The distributed computing system may include multiple versions of a single service. Each of the different versions of the service may function autonomously, and may be located on a single machine, or on separate machines. Services are updated in a distributed computing system as bugs and security holes are discovered, to add new functionality, to modify aspects of the service (e.g., an interface or a signature of an operation), etc. It is beneficial for multiple versions of the service to remain operational until it is determined that all clients are compatible with the updated version of the service. In some instances it may be possible to have three or more versions of a single service in operation in parallel. This may occur, for example, when an updated version introduces compatibility issues with older versions of the service.

When the content based router 115 intercepts the message 108 from client 105, it uses the rules engine 130 to apply the forwarding rules 135 and version compatibility rules 140 to the message 108. The content based router 115 examines a message header, message context, and/or message body. A determination of an appropriate destination for the message can then be made based on the message header, message context, message body, forwarding rules 135 and/or service compatibility rules 140. The forwarding rules 135 cause the message 108 to be forwarded to the second version of the service 125 if the version compatibility rules 140 indicate that the message 108 is compatible with the second version of the service 125 (e.g., if the second version of the service 125 and the first version of the service 120 are fully compatible, or if the message 108 will not require use of an incompatible function or component). The forwarding rules 135 cause the message 108 to be forwarded to the first version of the service 120 if the version compatibility rules 140 indicate that the message is not compatible with the second version of the service 125 (e.g., if the message 108 will require use of an incompatible function of component). For example, the version compatibility rules may indicate that a security protocol used by the second version of the server 125 is not backwards compatible with the first version of the service 120. Therefore, if the message 108 is secured using a security protocol that functions on the first version of the service 120, rules engine 130 can identify that the message is not compatible with the second version of the service 125.

The content based router 115 may maintain a client log 145 that tracks what versions of services clients are compatible with. Entries may be added to the client log 145 when messages are received from a client. Each entry may identify a version of a service to which the message was ultimately sent. When the client log 145 indicates that all clients (or a majority of clients) are compatible with an updated version of a service (e.g., with the second version of the service 125), content based router 115 may notify an administrator that the first version of the service 120 can be taken offline (e.g., removed from the distributed computing system). Alternatively, content based router 115 may automatically initiate a shutdown of the first version of the service 120 if client log 145 indicates that all clients (or a specified percentage of clients) are compatible with the second version of the service 125.

Services (e.g., first version of service 120 and second version of service 125) may be discretely defined sets of contiguous and autonomous functionality (e.g., business functionality, technical functionality, etc.). Services 120, 125 may be resident on personal computers (PC), servers, routers, etc. Each service 120, 125 may represent a process, activity or other resource that can be accessed and used by other services or clients within the distributed computing system. Each service 120, 125 may be independent of other services 120, 125, and may be accessed without knowledge of its underlying platform implementation.

In an example for a business function of "managing orders," services may include, for example, create order, fulfill order, ship order, invoice order, cancel/update order, etc. Each such service may be autonomous from the other services that are used to manage orders, and may be remote from one another and have different platform implementations. However, the services may be combined and used by one or more applications to manage orders.

Each service 120, 125 may have a service address to which messages directed to the service are sent. The service address is included in a header of the message 108. A format of the service address may depend on a transport mechanism used by the service. For example, if the transport mechanism is HTTP or FTP, then the service address may include a host number and a port number. If, on the other hand, the transport mechanism is JMS, the service address may be a JMS queue number. If a message is sent to an incorrect service address, a message cannot be processed by the service.

First version of the service 120 may process the forwarded message 108 and generate a response message, which may be transmitted back to client 105. The response message may be sent directly back to client 105, or may be sent to client 105 through content based router 115. Alternatively, if the message 108 is forwarded to the second version of the service 125, second version of the service 125 may process the forwarded message 108 and generate a response message, which may be transmitted back to client 105 (directly or through content based router 115). The response message may notify the client 105 that the service has been updated and/or of a new service address of the updated service. Alternatively, the client 105 may not know that it is using an updated version of the service.

FIG. 2 illustrates an exemplary distributed computing system 200, in which embodiments of the present invention may operate. In one embodiment, the distributed computing system 200 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 200 may include clients (e.g., first client 205 and additional clients 225) and services (e.g., first service 210, additional services 230 and core ESB services 215), connected via a network 235. Each of the clients 205 and 225 and services 210, 215, 230 may be both message producers and message consumers, as described below.

The network 235 may be a public network (e.g., Internet), a private network (e.g., Ethernet or a local area Network (LAN)), or a combination thereof. In one embodiment, the network 235 includes an enterprise service bus (ESB). An ESB is an event-driven and standards-based messaging engine that provides services for more complex architectures. The ESB provides an infrastructure that links together services 210, 215, 230 and clients 205 and 225 to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

In the illustrated embodiment, the first client 205 is a message producer. Alternatively, additional clients 225, first service 210, additional services 230 or core ESB services 215 may be message producers. A message producer is a client or service that generates a message. Messages include data that may convey information to, or initiate an event on, a message consumer (e.g., a service or client). A message may be generated for any of a myriad of purposes. For example, the message may be generated to report a purchase of a good, to request contact information, to begin a remote process (e.g., initiate a service), etc.

In the illustrated embodiment, the first service 210 is a message consumer. Alternatively, first client 205, additional clients 225, core ESB services 215 or additional services 230 may be message consumers. A message consumer receives a message generated by a message producer, and sent to an address (e.g., service address or client address) of the message consumer. Based on the content of the message, the message consumer may store information contained in the message, generate a response message to send to a service or client, undergo a state change, and/or initiate some other event. A state change initiated by a message may be dependent on contents of the message (e.g., the message body, message context, etc.), rules governing responses to the message, etc.

In one embodiment, the distributed computing system 200 includes an ESB that has a collection of core ESB services 215. The core ESB services 215 act on messages that flow through the ESB. Messages can also be directed towards any of the core ESB services 215 in the same manner as described above with reference to the first service 210 and additional services 230. Any of the core ESB services 215 may include one or more general purpose computing devices (e.g., personal computer or server) and/or special purpose computing devices configured to act on messages that flow between message producers (e.g., clients or services) and message consumers (e.g., clients or services) within the ESB.

In one embodiment, the core ESB services 215 include a content based router 220. The content based router 220 is a service of the ESB that monitors the network 235 for messages, and transparently routes the messages between clients and services. In one embodiment, the content based router 220 includes a rules engine 255, forwarding rules 260, and an active service version list 270. When the content based router 220 intercepts a message, rules engine 255 processes the forwarding rules 260 to determine whether the message should be forwarded to a different service than the one to which it is addressed. The forwarding rules 260 may identify versions of services, and under what circumstances received messages should be forwarded to which versions of the services. Therefore, the content based router 220 can determine an appropriate version of a service to forward a message to.

In one embodiment, the forwarding rules 260 are stored in a repository (not shown). The repository may be internal to the content based router 220, or connected with the content based router 220 via the network 235. In one embodiment, the repository is a service of the ESB.

In one embodiment, the content based router 220 further includes an active service version list 270. The active service version list 270 identifies all versions of services active on the ESB. The active service version list 270 may also identify older versions of services that are no longer active. In one embodiment, the active version service list 270 also identifies version compatibilities between versions of services. Accordingly, some forwarding rules 260 may access the active service version list 270 to determine where a message should be forwarded.

The core ESB services 215 may include one or more additional modules 250, each of which may be a service of the ESB. Examples of additional modules 250 include modules that provide services for splitting a message into multiple messages, combining multiple messages into a single message, transforming messages from a first format to a second format, applying rules to a message, storing copies of messages, etc. Each additional module 250 may provide a service to clients 205 and 225 and/or services 210 and 230 of the distributed computing system 200.

Figure 3:
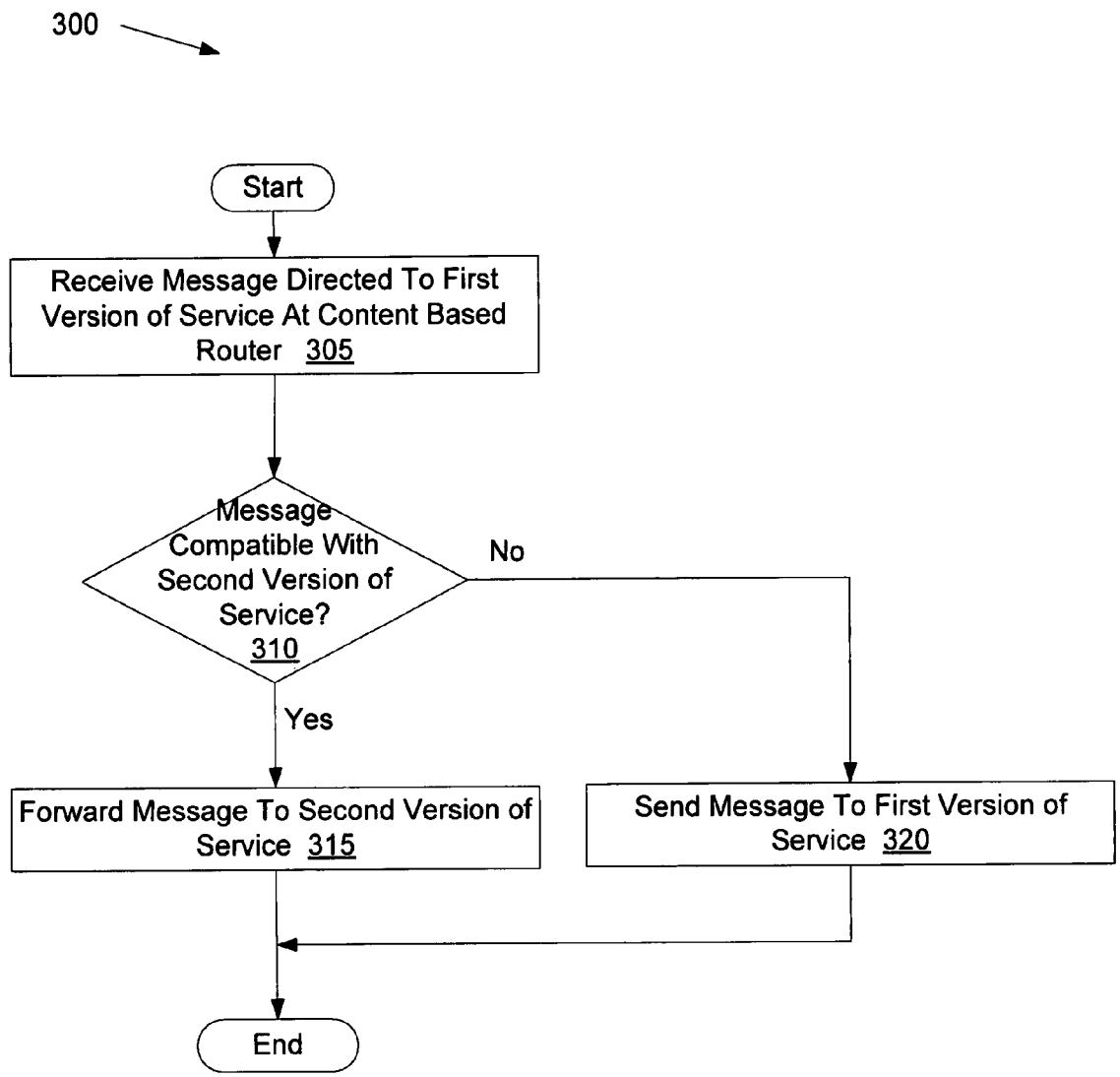
FIG. 3 illustrates a flow diagram of one embodiment for a method of forwarding messages in a distributed computing system.

FIG. 3 illustrates a flow diagram of one embodiment for a method 300 of forwarding messages in a distributed computing system. In one embodiment, the distributed computing system is a service oriented architecture (SOA) that includes an enterprise service bus (ESB). The method may be performed by processing logic that may comprise hardware (e.g., circuitry, dedicated logic, programmable logic, microcode, etc.), software (such as instructions run on a processing device), or a combination thereof. In one embodiment, method 300 is performed by content based router 115 of FIG. 1. In a further embodiment, content based router 115 may be a core ESB service 215 in a distributed computing system 200 as shown in FIG. 2.

Referring to FIG. 3, method 300 includes receiving a message at a content based router that is directed to a first version of a service (block 305). At block 310, processing logic determines whether the message is compatible with a second version of the service. In one embodiment, this determination is made by applying one or more of a forwarding rule and a version compatibility rule using a rules engine at the content based router. If the message is compatible with the second version of the service, the method proceeds to block 315. If the message is not compatible with the second version of the service, the method proceeds to block 320.

At block 320, the message is forwarded to the first version of the service. At block 315, the message is forwarded to the second version of the service. The second version of the service may include an update of the first version of the service. The update may remove a security hole, remove a known bug, add additional features or components, etc.

Figure 4:
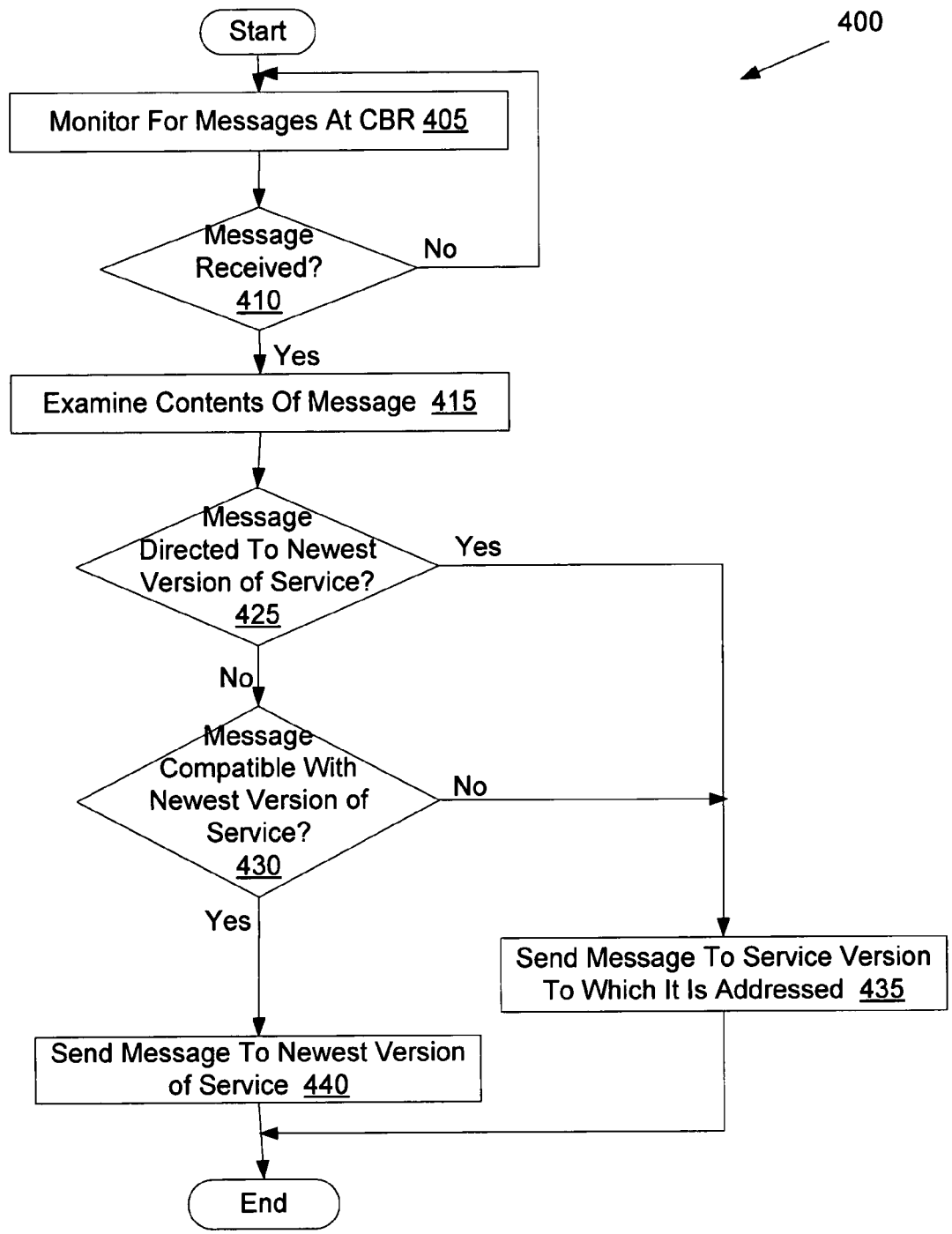
FIG. 4 illustrates a flow diagram of one embodiment for a method of determining which version of a service is appropriate to process a message.

FIG. 4 illustrates a flow diagram of one embodiment for a method 400 of determining which version of a service is appropriate to process a message. In one embodiment, the distributed computing system is a service oriented architecture (SOA) that includes an enterprise service bus (ESB). The method may be performed by processing logic that may comprise hardware (e.g., circuitry, dedicated logic, programmable logic, microcode, etc.), software (such as instructions run on a processing device), or a combination thereof. In one embodiment, method 400 is performed by content based router 115 of FIG. 1. In a further embodiment, content based router 115 may be a core ESB service 215 in a distributed computing system 200 as shown in FIG. 2.

Referring to FIG. 4, method 400 includes monitoring for messages at a content based router (CBR) (block 405). In one embodiment, all messages passing through an ESB are monitored. Alternatively, one or more services may be monitored for incoming messages.

At block 410, processing logic determines whether a message has been received by a content based router. If a message is received, the method proceeds to block 415. If no message is received, the method continues to block 405, and processing logic continues to monitor for messages.

At block 415, the contents of a received message are examined. In one embodiment, only a header of the received message is examined. Alternatively, other contents of the received message may be examined, such as a message context and message body.

At block 425, processing logic determines whether the message is directed to the newest version of a service. A distributed computing system may include an active first version, second version and third version of a service. Each version may operate independently of the other versions, and may be compatible with different clients. Each update to a service often adds improvements over older versions. Therefore, if possible, it is advantageous to use the newest version of the service. Processing logic in one embodiment makes a determination of whether the message is sent to a newest version of the service based on an active services list. The list of active services may identify each version of active services, along with version compatibilities between the active versions. Alternatively, processing logic may determine whether the message is directed to a newest version of the service by processing one or more forwarding rules and/or version compatibility rules. For example, a forwarding rule may identify each active version of the service, and under what circumstances a message should be forwarded to specific versions of the service. As services are decommissioned, the forwarding rule may be updated to reflect the fact that the decommissioned version of the service is no longer active. If the message is directed to the newest version of the service, the method proceeds to block 435. If the message is not directed to the newest version of the service, the method proceeds to block 430.

At block 430, processing logic determines whether the message is compatible with the newest version of the service. In one embodiment, processing logic makes such a determination based on version compatibility rules. The version compatibility rules may identify what features of updated versions are not backwards compatible with older versions. In a further embodiment, the version compatibility rules may be integrated with forwarding rules to identify under what circumstances messages should be forwarded to each of the active versions of a service. An active service version list may also identify compatibilities between versions of services. As versions change, occasionally compatibility issues arise between service versions. If a message is not compatible with the newest version of the service, it may not function properly or at all if sent to that newest version of the service. Accordingly, if the message is not compatible with the newest version of the service, the method proceeds to block 435. If the message is compatible with the newest version of the service the method proceeds to block 440.

At block 440, the message is sent to the newest version of the service. At block 435, the message is sent to the version of the service to which it was directed. Alternatively, processing logic may further determine a newest active version of the service with which the message is compatible, and send the message to that version. For example, if a first version, second version and third version are operable on a distributed computing system, and if a message is originally directed to the first version, but cannot be forwarded to the third version due to lack of compatibility, it may still be forwarded to the second version.

Figure 5:
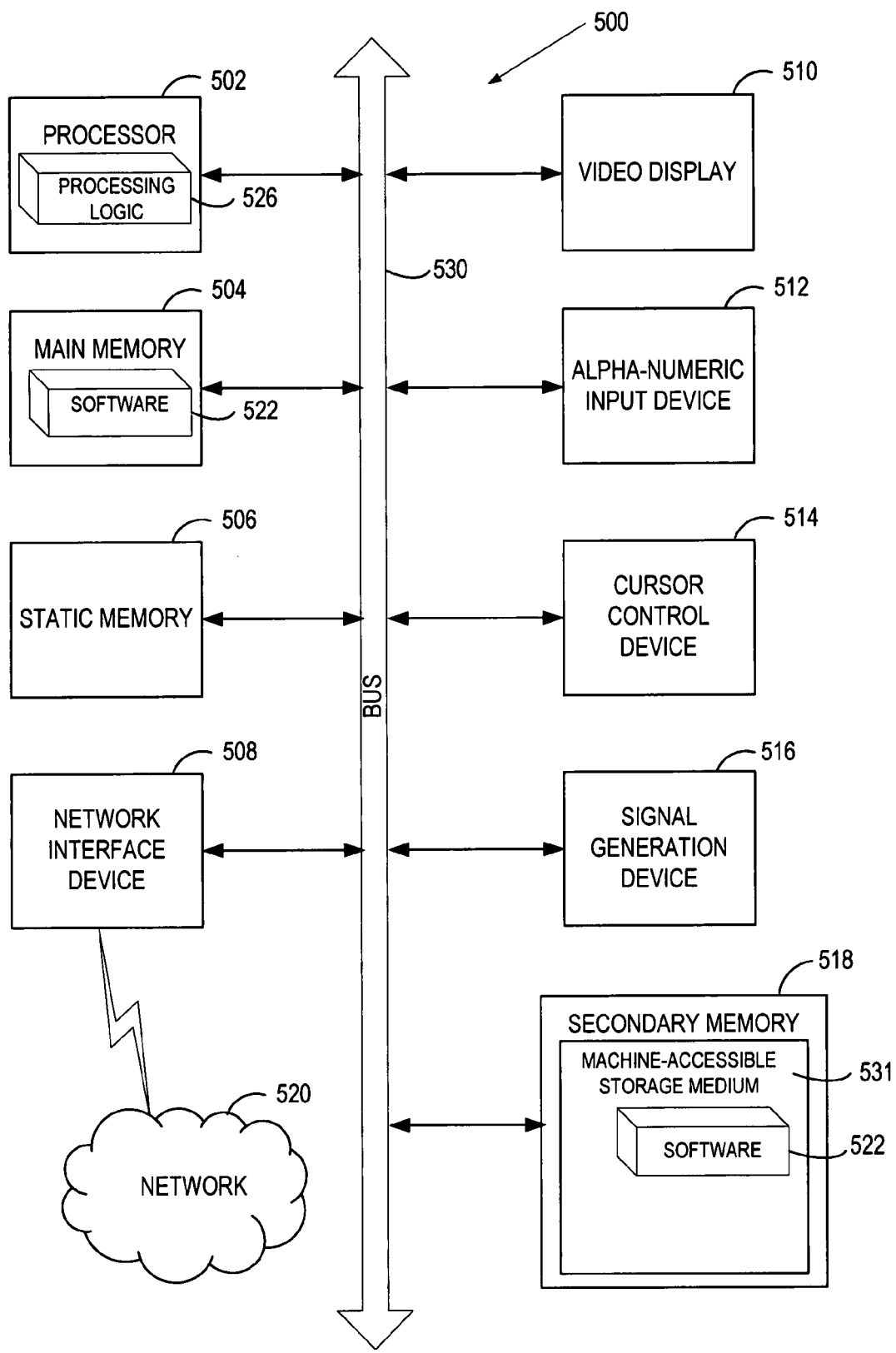
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-accessible storage media. The software 522 may further be transmitted or received over a network 520 via the network interface device 508.

The machine-accessible storage medium 531 may also be used to store data structure sets that define user identifying states and user preferences that define user profiles. Data structure sets and user profiles may also be stored in other sections of computer system 500, such as static memory 506.

While the machine-accessible storage medium 531 is shown in an exemplary embodiment to be a single medium, the term "machine-accessible storage medium" should be taken to include a single medium or multiple media (e.g., a centralized or distributed database and/or associated caches and servers) that store the one or more sets of instructions. The term "machine-accessible storage medium" shall also be taken to include any medium that is capable of storing, encoding or carrying a set of instructions for execution by the machine that causes the machine to perform any one or more of the methodologies of the present invention. The term "machine-accessible storage medium" shall accordingly be taken to include, but not be limited to, solid-state machines, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method, comprising:
   receiving, by a computing device comprising a content based router, from a client over a network of a distributed computing system, a message directed to a first version of a service, the first version of the service being hosted by a first node and having a first service address;
   determining whether the message is at least partially compatible with a second version of the service hosted by a second node and having a second service address, wherein determining whether the message is at least partially compatible with the second version of the service comprises processing the message by a rules engine using a version compatibility rule that indicates incompatibilities between versions of the service and a forwarding rule that identifies one or more versions of the service to forward the message to, and wherein the message is partially compatible with the second version of the service if the message will not require use of an incompatible function or component of the second version of the service;

determining whether to transmit the message to the second version of the service instead of to the first version of the service based on whether the message is at least partially compatible with the second version of the service;

transmitting, by the computing device, the message over the network to the second version of the service instead of to the first version of the service if the message is at least partially compatible with the second version of the service; and transmitting the message over the network to the first version of the service if the message is not at least partially compatible with the second version of the service.

2. The method of claim 1, further comprising:
determining whether the second version of the service is active on the distributed computing system, wherein the second version of the service includes an update of the first version.

3. The method of claim 1, wherein the client that sent the message is incompatible with the second version of the service if the message is incompatible with the second version of the service, further comprising:
determining if any clients are incompatible with the second version of the service; and
removing the first version of the service from the distributed computing system if all clients are compatible with the second version of the service.

4. The method of claim 1, further comprising:
maintaining a client log that tracks what versions of services clients are compatible with; and
deactivating the first version of the service when the client log indicates that a specified percentage of clients are compatible with the second version of the service.

5. The method of claim 1, wherein determining whether the message is compatible with the second version of the service comprises comparing the message to an active service version list that identifies all active versions of the service and compatibilities between said active versions of the service.

6. The method of claim 1, wherein the second version of the service is a newest version of the service, the method further comprising:
determining whether the message is compatible with a third version of the service that is older than the second version of the service but newer than the first version of the service; and
transmitting the message to the third version of the service if the message is not compatible with the second version of the service but is compatible with the third version of the service.

7. A non-transitory machine readable storage medium including instructions that, when executed by a processor, cause the processor to perform operations comprising:
receiving, by a computing device comprising the processor and a content based router, from a client over a network of a distributed computing system, a message directed to a first version of a service;

determining whether the message is at least partially compatible with a second version of the service, wherein determining whether the message is at least partially compatible with the second version of the service comprises processing the message by a rules engine using a version compatibility rule that indicates incompatibilities between versions of the service and a forwarding rule that identifies one or more versions of the service to forward the message to, and wherein the message is partially compatible with the second version of the service if the message will not require use of an incompatible function or component of the second version of the service;

determining whether to transmit the message to the second version of the service instead of to the first version of the service based on whether the message is at least partially compatible with the second version of the service;

transmitting, by the computing device, the message over the network to the second version of the service instead of to the first version of the service if the message is at least partially compatible with the second version of the service; and transmitting the message over the network to the first version of the service if the message is not at least partially compatible with the second version of the service.

8. The non-transitory machine readable storage medium of claim 7, the operations further comprising:
determining whether the second version of the service is active on the distributed computing system, wherein the second version of the service includes an update of the first version.

9. The non-transitory machine readable storage medium of claim 7, wherein the client that sent the message is incompatible with the second version of the service if the message is incompatible with the second version of the service, the operations further comprising:
determining if any clients are incompatible with the second version of the service; and
removing the first version of the service from the distributed computing system if all clients are compatible with the second version of the service.

10. The non-transitory machine readable storage medium of claim 7, the operations further comprising:
maintaining a client log that tracks what versions of services clients are compatible with; and
deactivating the first version of the service when the client log indicates that a specified percentage of clients are compatible with the second version of the service.

11. The non-transitory machine readable storage medium of claim 7, wherein determining whether the message is compatible with the second version of the service comprises comparing the message to an active service version list that identifies all active versions of the service and compatibilities between said active versions of the service.

12. The non-transitory machine readable storage medium of claim 7, wherein the second version of the service is a newest version of the service, the operations further comprising:
determining whether the message is compatible with a third version of the service that is older than the second version of the service but newer than the first version of the service; and
transmitting the message to the third version of the service if the message is not compatible with the second version of the service but is compatible with the third version of the service.

13. The non-transitory machine readable storage medium of claim 7, wherein the first service address comprises at least one of a first host number, a first port number or a first JMS queue number and the second service address comprises at least one of a second host number, a second port number or a second JMS queue number.

14. A distributed computing system comprising:
a repository having stored thereon a version compatibility rule that indicates incompatibilities between versions of the service and a forwarding rule that identifies one or more versions of the service to forward the message to; and
a computing device, comprising a content based router, coupled to the repository and connected with a network that includes an enterprise service bus, a first node hosting a first version of a service and a second node hosting a second version of the service, wherein the computing device is to:
receive a message from a client over the network, the message directed to the first version of the service;
process the message, using a rules engine and the version compatibility rule and the forwarding rule, to determine whether the message is at least partially compatible with the second version of the service, wherein the message is partially compatible with the second version of the service if the message will not require use of an incompatible function or component of the second version of the service;
determine whether to transmit the message to the second version of the service instead of to the first version of the service based on whether the message is at least partially compatible with the second version of the service;
transmit the message over the network to the second version of the service hosted by the second node instead of to the first version of the service if the message is at least partially compatible with the second version of the service; and
transmit the message over the network to the first version of the service if the message is not at least partially compatible with the second version of the service.

15. The distributed computing system of claim 14, wherein the content based router is to determine whether the second version of the service is active on the distributed computing system, wherein the second version of the service includes an update of the first version.

16. The distributed computing system of claim 14, wherein the client that sent the message is incompatible with the second version of the service if the message is incompatible with the second version of the service.

17. The distributed computing system of claim 16, wherein the content based router is to determine if any clients are incompatible with the second version of the service, and to direct an administrator to remove the first version of the service from the distributed computing system if all clients are compatible with the second version of the service.

18. The distributed computing system of claim 14, wherein the content based router is to transmit a patch to a client that sent the message if the message is not compatible with the second version of the service, wherein the client can execute the patch to become compatible with the second version of the service.

19. A computing device, comprising:
a memory; and
a processor coupled to the memory, wherein the processor is to execute a content based router from the memory, the content based router to:
intercept a message transmitted over a network from a client to a first version of a service, the first version of the service having a first service address;
use a rules engine that applies a forwarding rule that identifies one or more versions of the service to forward the message to and a version compatibility rule that indicates incompatibilities between versions of the service to determine whether the message is at least partially compatible with a second version of the service, wherein the message is partially compatible with the second version of the service if the message will not require use of an incompatible function or component of the second version of the service, the second version of the service having a second service address;
determine whether to transmit the message to the second version of the service instead of to the first version of the service based on whether the message is at least partially compatible with the second version of the service;
transmit the message to the second version of the service instead of to the first version of the service if the message is at least partially compatible with the second version of the service; and
transmit the message to the first version of the service if the message is not at least partially compatible with the second version of the service.

20. The computing device of claim 19, wherein the content based router is further to:
determine whether the second version of the service is active on the distributed computing system, wherein the second version of the service includes an update of the first version.

21. The computing device of claim 19, wherein the client that sent the message is incompatible with the second version of the service if the message is incompatible with the second version of the service, and wherein the content based router is further to:
determine if any clients are incompatible with the second version of the service; and
remove the first version of the service from the distributed computing system if all clients are compatible with the second version of the service.

* * * * *